United States Patent [19]

Wei

[11] E Patent Number: Re. 32,843

[45] Reissued Date of Patent: Jan. 24, 1989

[54] SILICON CARBIDE WHISKER REINFORCED CERAMIC COMPOSITES AND METHOD FOR MAKING SAME

[75] Inventor: George C. Wei, Oak Ridge, Tenn.

[73] Assignee: Martin Marietta Energy Systems, Inc., Oak Ridge, Tenn.

[21] Appl. No.: 847,961

[22] Filed: Apr. 3, 1986

Related U.S. Patent Documents

Reissue of:

[64] Patent No.: 4,543,345
Issued: Sep. 24, 1985
Appl. No.: 578,407
Filed: Feb. 9, 1984

[51] Int. Cl.[4] ..... C04B 35/56; C04B 35/80; C04B 35/10

[52] U.S. Cl. ..... 501/95; 501/89; 501/91; 264/65

[58] Field of Search ..... 501/88, 89, 95, 91; 264/65

[56] References Cited

U.S. PATENT DOCUMENTS

| | | | |
|---|---|---|---|
| 3,541,672 | 11/1970 | Hulse | 501/89 |
| 3,813,340 | 5/1974 | Knippenberg et al. | 501/88 |
| 4,158,687 | 6/1979 | Yajima et al. | 264/65 |
| 4,284,612 | 8/1981 | Horne, Jr. et al. | 501/88 |
| 4,314,852 | 2/1982 | Brennan et al. | 501/88 |
| 4,388,255 | 6/1983 | Simpson | 264/65 |
| 4,394,231 | 8/1983 | Prewo et al. | 501/89 |
| 4,412,854 | 11/1983 | Layden | 501/89 |
| 4,463,058 | 7/1984 | Hood et al. | 501/32 |
| 4,485,179 | 11/1984 | Brennan et al. | 501/88 |
| 4,500,504 | 2/1985 | Yamamoto | 501/88 |
| 4,507,224 | 3/1985 | Toibana et al. | 501/88 |

FOREIGN PATENT DOCUMENTS

| | | | |
|---|---|---|---|
| 0767030 | 11/1971 | Belgium | 501/89 |
| 0047803 | 4/1977 | Japan | 501/91 |
| 0381645 | 5/1973 | U.S.S.R. | 501/89 |

OTHER PUBLICATIONS

Tamari, N et al.; "Fabrication of Silicon Carbide Whisker-Silicon Nitride Composite Materials and Their Physical Properties", Osaka Kogyo Gijutsu Shikensho Kiho 33(2):129-134, 1962.

Wei et al.; "Silicon Carbide Whisker-Reinforced Aluminum Oxide Composite", American Ceramic Society Meeting, Columbus, Ohio 11-2-83.

"Fibre Reinforced Ceramics" by D. C. Phillips, Materials Development Division, A. E. R. E. Harwell, England, Feb. 1981.

"High-Strength Silicon Carbide-Fibre-Reinforced Glass Matrix Composites", by K. M. Prewo et al., J. of Mat. Science, 15, pp. 463-468, (1980).

Silicon Carbide Yarn Reinforced Glass Matrix Composites, Prewo et al., J. of Matrix Science, 17, pp. 1201-1206.

"Silicon Nitride Ceramic Composites with High Toughness", Lindley et al., Nature 229, pp. 192-193, Jan. 15, 1971.

*Primary Examiner*—Mark L. Bell
*Attorney, Agent, or Firm*—D. Barbara McKenzie-Wardell; Bruce M. Winchell

[57] ABSTRACT

The present invention is directed to the fabrication of ceramic composites which possess improved mechanical properties especially increased fracture toughness. In the formation of these ceramic composites, the single crystal SiC whiskers are mixed with fine ceramic powders of a ceramic material such as $Al_2O_3$, mullite, or $B_4C$. The mixtures which contain a homogeneous disperson of the SiC whiskers are hot pressed at pressures in a range of about 28 to 70 MPa and temperatures in the range of about 1600° to 1950° C. with pressing times varying from about 0.75 to 2.5 hours. The resulting ceramic composites show an increase in fracture toughness of up to about 9 MPa.m$^{\frac{1}{2}}$ which represents as much as a two-fold increase over that of the matrix material.

9 Claims, No Drawings

SILICON CARBIDE WHISKER REINFORCED CERAMIC COMPOSITES AND METHOD FOR MAKING SAME

Matter enclosed in heavy brackets [ ] appears in the original patent but forms no part of this reissue specification; matter printed in italics indicates the additions made by reissue.

This invention was made as a result of work under Contract No. W-7405-ENG-26 between the U.S. Department of Energy and Union Carbide Corporation, Nuclear Division.

BACKGROUND OF THE INVENTION

Generally, the present invention relates to ceramic composites and the preparation thereof, and more particularly to such composites in which single crystal silicon carbide whiskers are dispersed to provided improvements in the fracture toughness and fracture strength of the ceramic.

Recent emphasis has been placed upon the use of ceramic materials as structural components in heat engines and high-temperature conversion systems such as turbines. For the use of ceramic in such applications fracture toughness ($K_{Ic}$) of the material is a critical consideration. Conventional ceramic materials have relatively low fracture toughness with the exception of $Al_2O_3$—$ZrO_2$ and partially stabilized $ZrO_2$. Monolithic ceramic material such as SiC, $Si_3N_4$, $Al_2O_3$ and mullite ($3Al_2O_3.2SiO_2$) have a fracture toughness in the order of about 3 to 5 MPa.m$^{\frac{1}{2}}$ and a fracture strength ($\sigma_f$) in the range of about 30–100 ksi (210–700 MPa). Utilization of these ceramic materials for the fabrication of structural components for use in heat engines and other high-temperature conversion systems required the use of ceramic components with very small flaw size less than about 50 μm) in order to provide acceptable fracture toughness. However, in structural components especially of complex configuration, the determination of such small flaw sizes has been very difficult to achieve by using nondestructive inspection techniques.

Efforts to overcome the lack of sufficient fracture toughness in ceramic material included the development of fiber-reinforced composites. For example, graphite fiber reinforced ceramics provided impressive fracture toughness and strength at ambient temperatures but these ceramic composites were found to be of questionable value when subjected to elevated temperatures because of the oxidation of the carbon fibers and the reaction between the carbon in the fibers and the constituents of the ceramic material. On the other hand, the use of inorganic fibers such as silicon carbide (SiC) filaments and chopped fibers for reinforcing or strengthening ceramic material exhibited some success but encountered several problems which considerably detracted from their use. For example, conventional silicon carbide filaments or chopped fibers are of a continuous polycrystalline structure and suffer considerable degradation due to grain growth at temperatures about about 1250° C. which severely limited their use in high temperature fabrication processes such as hot-pressing for producing ceramic composites of nearly theoretical density. Further, during high pressure loadings such as encountered during hot pressing, the polycrystalline fibers undergo fragmentation which detracts from the reinforcing properties of the fibers in the ceramic composite. Also, these polycrystalline fibers provided insufficient resistance to cracking of the ceramic composite since the fibers extending across the crack line or fracture plane possess insufficient tensile strength to inhibit crack growth through the composite especially after the composite has been fabricated by being exposed to elevated pressures and temperatures as in hot pressing.

SUMMARY OF THE INVENTION

Accordingly, it is the primary aim or objective of the present invention to provide ceramic composites strengthened with silicon carbide whiskers which provide the ceramic composites with improved and more predictable toughness characteristics than heretofore obtainable. Generally, the ceramic composites which are characterized by increased toughness and resistance to fracture or cracking comprises a matrix of ceramic material having homogeneously dispersed therein about 5–60 vol. % of silicon carbide whiskers These whiskers have a monocrystalline or single crystal structure and are in a size range of about 0.6 micrometers in diameter and a length of about 10–80 micrometers.

The ceramic composites are prepared by hot pressing a homogeneous mixture of particulate ceramic material and the silicon carbide whiskers at an adequate pressure and temperature to provide the composite with the density of greater than 99% of the theoretical density of the ceramic material.

The use of the single crystal whiskers in the ceramic composite provide a significant improvement in the fracture toughness of the composite due to their ability to absorb cracking energy. More specifically, in a ceramic matrix where the SiC whisker-matrix interface sheer strength is relatively low as provided by radial tensile stresses across the whisker-matrix bond a process termed "whisker pull-out" occurs during cracking to absorb the cracking energy and effectively reduce the tendency to crack and also inhibit crack propagation. Whisker pull-out occurs as the matrix is subjected to crack-forming stresses. As the crack-front propagates into the composite many of the whiskers which span the crack line and extend into the ceramic matrix on opposite sides of the crack must be either fractured or pulled out of the matrix in order for the crack to grow or propagate through the ceramic. Since the single crystal SiC whiskers possess sufficient tensile strength so as to resist fracturing they must be pulled out of the matrix for the crack to propagate. As these whiskers are pulled out of the matrix they exhibit considerably bridging forces on the face of the crack and effectively reduce the stress intensity at the crack tip so as to absorb the cracking energy.

The use of the SiC whiskers in ceramic matrices as will be described in detail below provide fracture toughness of the ceramic composites in a range of about 4–9 MPa.m$^{\frac{1}{2}}$ and fracture strength in the range of about 38–120 ksi depending on the ceramic matrix material containing the SiC whiskers. This represents a considerable increase in fracture toughness which in some instances is a factor of 2 or greater over the fracture toughness of the monolithic ceramic material used in the composite which is in the range of about 2–4 MPa.m$^{\frac{1}{2}}$.

Other and further objects of the invention will be obvious upon an understanding of the illustrative embodiments and methods about to be described or will be indicated in the appended claims, and various advantages not referred to herein will occur to one skilled in the art upon employment of the invention in practice.

DETAILED DESCRIPTION OF THE INVENTION

As generally described above, the present invention is directed to ceramic composites which exhibit improved mechanical properties, particularly increased fracture toughness, and to the manufacture of such composites.

In accordance with the present invention ceramic composites are prepared by forming a mixture of ceramic powder or particulates with monocrystalline SiC whiskers uniformly dispersed in the mixture. The mixture is then hot pressed to form a ceramic-SiC whisker composite of a theoretical density essentially equal to the theoretical density of the material.

The ceramic material found to be particularly useful for fabricating the ceramic composites of the present invention which exhibit increased toughness over the monolithic form of the ceramic material include $Al_2O_3$, mullite ($3Al_2O_3.2SiO_2$) and $B_4C$. While it is expected that other ceramic material such as $Si_3N_4$ or cordierite ($2MgO.2Al_2O_3.5SiO_3$) may be used to provide ceramic-SiC whisker composites of increased toughness preliminary results indicate that ceramic-SiC whisker composites formed with ceramic materials such as $Al_2O_3.ZrO_2$, $ZrO_2$, $Si_3N_4$ (with $Al_2O_3$ and $Y_2O_3$ dopants), and SiC (doped with B and C) do not exhibit significant toughening even though the composite densities greater than about 94% of the theoretical density were provided by hot-pressing composites of these ceramic materials.

The mixing of the SiC whiskers with ceramic powders to provide a homogeneous dispersion of the whiskers in the matrix powders was difficult to achieve due to the tendency of forming undesirable agglomeration or whisker clumping during the mixing step. It has been found that ceramic matrix powders in a size range of about 0.5 to 1.0 micrometers are preferred to form the homogeneous mixture since the tendency of whiskers to agglomerate is less than these fine powders. However, with improved mixing techniques it is expected that agglomerate-free homogeneous mixtures can be provided with ceramic powders up to about 44 micrometers (−325 mesh).

The SiC whiskers used in the present invention are single crystals containing beta and mixed alpha and beta phases of silicon carbide. The average diameter of the whiskers is 0.6 micrometers and a length of 10–80 micrometers with an average aspect ratio of 75. The whisker content in an average lot is 80–90% with the rest being formed of silicon carbide powders. Chemical analysis of the whiskers showed major impurities of oxygen: 0.1 wt. %; Ca, Mn, Mg, Fe, Al: 0.1–0.8 wt. %; Cr, K, Cu, Ni, Na: 100–1,000 ppm. These SiC whiskers are manufactured from rice hulls and are commercially available as grade F-9 (SC-9) whiskers from ARCO Metals, Silag Operation, Greer, S.C. [or under the trademark "Tokamax" obtainable from Tokai Carbon Company, Tokyo, Japan, which has a sales office in New York, N.Y.]. Because of the high purity of the SiC whiskers they are stable at temperatures up to 1800° C. in inert gases. Also, the thermal stability of the SiC whiskers in ceramic matrices at processing temperatures up to about 1900° C. provides a distinct advantage over continuous polycrystalline SiC fibers that typically degrade due to grain growth above about 1200° C. Reported values for the mechanical properties of the relatively longer SiC whiskers indicate that the average tensile strength is of 7 GPa (1 Mpsi) and an elastic modulii of 700 GPa (100 Mpsi) are obtained.

The concentration of the SiC whiskers in the composite is in the range of about 5–60 vol. % and preferably about 5–40 vol. % with about 20 vol. % providing the best results. With SiC whisker concentrations greater than about 40 vol. % it is difficult to hot press the composites to densities greater than 99% of the theoretical density of this ceramic material material and with concentrations greater than about 60 vol. % SiC whiskers considerable whisker clumping occurs which detracts from the composite toughness. With less than about 5 vol. % whiskers insufficient toughness is achieved due to the low concentration of the SiC whiskers in the matrix which will expose an insufficient number of whiskers in the crack plane to adequately absorb the cracking energy.

The mixing of the SiC whiskers with the ceramic powders can be provided by employing any suitable mixing techique which will provide a homogeneous dispersion of the whiskers in the matrix powders with minimal agglomeration and whisker clumping. For example, suitable mixtures may be formed by using a Waring blender, a mixing medium and an ultrasonic homogenizer, with the best mixing being achieved when using the fine (0.5 to 1.0 micrometer) powders. In a typical mixing operation a predetermined amount of SiC whiskers and ceramic matrix powders are mixed in hexane in the blender at a rotational speed of 19,000 rpm for 2 minutes. This mixture was then further dispersed in suitable ultrasonic homogenizer until the container became warm and the whisker-powder-hexane mixture appeared "milky" and uniformly mixed. This mixture was then dried by evaporation with constant agitation under flowing air. Alternatively, distilled water used as the mixing medium with freeze-drying provided similar results. Also, dry mixing or mixing with other volatile media may be satisfactorily utilized to obtain a homogeneous mixture with minimal SiC whisker clustering or agglomeration. With any mixing techniques the mixing becomes more difficult for providing a homogeneous dispersion of the whiskers as the whisker content increases due to the clustering of the whiskers into bundles within the mixture.

Upon completing the mixing operation, the mixture was formed into a suitable article configuration and hot-pressed to a density of greater than 99% of the theoretical density of the material. Hot pressing was found to be necessary to provides composites with essentially the full theoretical density of the ceramic since green densities of less than about 50% theoretical density were obtained with conventional compaction techniques utilizing pressure loadings up to 210 MPa. It is necessary to provide composites with greater than about 99% of the theoretical density of the ceramic matrix material to obtain the maximum toughness with the minimum presence of porosity and other flaws which detract from the toughness of the composite. High density is also required from the standpoint of strength.

The hot pressing step may be achieved in a suitable induction or resistance heated furnace with punches or pressing components formed of graphite or any other suitable material which is capable of withstanding the required pressures and temperatures without adversely reacting with the composite constituents. For example, specimens, 38 mm in diameter by 13 mm thick, 25 mm in diameter by 13 mm thick, and 13 mm in diameter by 19 mm in length were hot pressed in a graphite resistance furnace with graphite punches and dyes lined with "Grafoil" a trademarked product of Union Carbide Corporation, New York, N.Y. Rectangular specimens of about 75 mm by 12 mm were made using round dyes with cheek pieces. The pressing was achieved in a vacuum furnace of less than about 1.3 mPa at temperatures ranging from about 1600° to 1950° C. and at pressures in the range of about 28 to 70 MPa for about 0.75 to 2.5 hours depending upon the matrix material. During the hot pressing step a pressing pressure of about half of the predetermined total pressure was applied to the composite until the composite reached the desired hot-pressing temperature, then full pressure was applied. Densification of the composite may be monitored by a linear variable displacement transducer attached to the top ram of the press.

The above-described hot pressing operation and the Examples below are directed to unidirectionally or uniaxially hot pressing the mixture for providing composites in which the whiskers are preferentially aligned and randomly distributed in a plane or axis perpendicular to the hot pressing axis. However, it is expected that satisfactory composites which exhibit increased toughness will be provided by employing isostatic hot-pressing techniques which provide for the omnidirectional orientation of the SiC whiskers within the composite. This orientation of the whiskers in the composite is particularly desirable for the fabrication of complex shapes such as turbine blades which are exposed to cracking stresses from various angles. In such isostatic hot-pressing operations, which may be readily achieved in a high temperature inert-gas autoclave, the pressures and temperatures applied to the mixture enclosed in a metal can such as tantalum to provide composites greater than about 99% theoretical density are expected to be in the same range as the pressures, durations, and temperatures used in the uniaxial pressing operations.

The stability of the SiC whiskers in the ceramic matrices during processing at temperatures up to about 1900° C. was found to be highly desirable. The SiC whiskers were very stable at these elevated temperatures because they are single crystals and do not degrade at temperatures greater than about 1250° C. due to grain growth which commonly occurs in continuous polycrystalline SiC fibers. Also, since the whiskers had a relatively low oxygen content as set forth above they did not react with the ceramic composites so as to effect decomposition of the whiskers. The attribute of the thermal stability of the SiC whiskers at such elevated temperatures which were necessary for hot-pressing composites to densities greater than 99% theoretical density is a significant factor in the successful development of the SiC whisker reinforced composites with improved fracture toughness and strength.

In order to provide a more facile understanding of the present invention examples are set forth below directed to the fabrication of SiC whisker-composite with various ceramic materials. As mentioned above, the hot-pressing technique employed for fabricating these composites is the use of a uniaxial applied pressure for providing composites with whiskers predominantly oriented in a plane orthagonal or perpendicular to the hot-pressing axis.

EXAMPLE I

Forty grams of $Al_2O_3$ powder (~0.3 μm in size) was dry mixed with 8.2 g or 20 vol. % SiC whiskers. The mixture was uniaxially hot-pressed at a temperature of 1850° C. under a pressure loading of 41 MPa for 45 minutes. The microstructure of the resulting composite consisted of SiC whiskers in a fine-grain (about 10 micrometers) $Al_2O_3$ matrix. The bulk density was over 99.7% of the theoretical density of which is 3.97 mg/m$^3$. The fracture toughness ($K_{Ic}$) for crack propagation along the hot-pressing axis at room temperature was 8 to 9 MPa.m$^{\frac{1}{2}}$ and the room temperature facture strength ($\sigma_f$) was 100 ksi.

Several pressings made with $Al_2O_3$ powder as in Example I but with different whisker concentrations, temperatures, pressures and ceramic constituents are set forth in Table 1 below.

TABLE 1

Hot-pressing results of SiC-whisker $Al_2O_3$-matrix composites[a]

| Sample No. (SC) | SiC whisker vol. % | $Al_2O_3$ type | Hot Pressing Temperature (°C.) | Hot Pressing Pressure (MPa) | Density (Mg/m$^3$) | Density % T.D. |
|---|---|---|---|---|---|---|
| 51 | 20 | Linde-A[b] | 1900 | 62 | 3.77 | 98.7 |
| 61 | 20 | " | 1600 | 41 | 3.62 | 94.8 |
| 68 | 20 | " | 1750 | 62 | 3.81 | 99.8 |
| 76 | 20 | " | 1750 | 69 | 3.81 | 99.8 |
| 79 | 20 | " | 1750 | 41 | 3.71 | 97.0 |
| 83 | 20 | " | 1850 | 41 | 3.82 | 99.9 |
| 89 | 20 | " | 1850 | 59 | 3.82 | 99.9 |
| 90 | 10 | " | 1850 | 59 | 3.90 | 99.8 |
| 91 | 30 | " | 1850 | 59 | 3.73 | 99.8 |
| 92 | 0 | " | 1850 | 59 | 3.97 | 100 |
| 123 | 20 | " | 1850 | 59 | 3.82 | 99.9 |
| 124 | 20 | " | 1850 | 62 | 3.82 | 99.9 |
| 134 | 20 | " | 1850 | 28 | 3.81 | 99.8 |
| 135 | 20 | " | 1850 | 41 | 3.82 | 99.9 |
| 136 | 20 | " | 1850 | 55 | 3.82 | 99.9 |
| 137 | 10 | " | 1850 | 28 | 3.90 | 99.8 |
| 138 | 10 | " | 1850 | 41 | 3.90 | 99.8 |
| 139 | 10 | " | 1850 | 55 | 3.90 | 99.8 |
| 140 | 30 | " | 1850 | 28 | 3.67 | 98.2 |
| 141 | 30 | " | 1850 | 41 | 3.73 | 99.8 |
| 142 | 30 | CR-10[c] | 1850 | 55 | 3.73 | 99.8 |
| 146 | 20 | " | 1850 | 41 | 3.82 | 99.9 |
| 154 | 20 | " | 1850 | 41 | 3.82 | 99.9 |
| 156 | 5 | " | 1850 | 41 | 3.94 | 99.9 |
| 157 | 10 | " | 1850 | 41 | 3.90 | 99.9 |
| 158 | 20 | " | 1850 | 41 | 3.82 | 99.9 |
| 159 | 30 | " | 1850 | 41 | 3.74 | 99.9 |
| 162 | 40 | " | 1850 | 41 | 3.66 | 99.9 |
| 163 | 50 | " | 1850 | 41 | 3.58 | 99.7 |
| 164 | 60 | " | 1850 | 41 | 3.43 | 97.5 |

[a]Hot-pressing time, 45 minutes
[b]Union Carbide Corporation. Indianapolis, Indiana (avg. particle size 0.3 m. T.D. 3.97 Mg/m$^3$)
[c]Backowowski International Corporation. Charlotte, North Carolina (avg. particle size 0.2 m. T.D. 3.97 Mg/m$^3$)

EXAMPLE II

Carborundum $B_4C$ powder (−44 micrometer, 12.1 g) was mixed with silicon carbide whiskers (3.9 g or 20 vol. %) and hexane (400 mL) in a Waring blender and then slurry dried. The mixture was uniaxially hot-pressed at a temperature of 1900° C. under a pressure loading of 62 MPa for one hour. The density of the hot-pressed composite was greater than 99.7% of the theoretical density which is 2.66 Mg/m$^3$. The $K_{Ic}$ is 5.3 MPa.m$^{\frac{1}{2}}$ and the $\sigma_f$ is 46 ksi at room temperature.

EXAMPLE III

Mullite powder (3 $Al_2O_3$.2$SiO_2$) of a size less than 44 μm was mixed with 2.5 g or 20 vol. % SiC whiskers in hexane using a Waring blender and then slurry dried. The composition or mixture was uniaxially hot-pressed at a temperature of 1600° C. under pressure loading of 70 MPa for one hour. The density of the hot-pressed composite was greater than 99.8% of the theoretical density of mullite which is 3.08 $Mg/m^3$. The $K_{Ic}$ was 4.6 MPa.$m^{\frac{1}{2}}$ and the $\sigma_f$ was 63 ksi at ambient temperature.

The fracture toughness values of the 20 vol. % SiC whisker $Al_2O_3$- and millite-matrix composites were substantially greater than those of the single-phase monolithic ceramics as shown in Table 2 below.

TABLE 2

$K_{Ic}$ and $\sigma_f$ of 20 vol. % SiC-whisker $Al_2O_3$—, mullite-, and $B_4C$-matrix composites

| Material | $K_{Ic}$ (MPa · $m^{\frac{1}{2}}$) | $\sigma_f$ (MPa) |
|---|---|---|
| 20 vol. % SiC whisker CR-10 $Al_2O_3$ | 9.0 | 805 ± 94 |
| 20 vol. % SiC whisker Linde-A $Al_2O_3$ | 8.6 | 600 ± 10 |
| $Al_2O_3$ | 4.6 | |
| 20 vol. % SiC whisker mullite composite | 4.6 | 438 ± 5 |
| Mullite | 2.2 | |

The toughness as expected was a function of the orientation of the crack plane and direction. With these values in Table 2 being obtained from specimens in which the crack propagation direction was normal to the hot-pressing axis while the crack plane was parallel to the hot-pressing axis. However, even when the crack propagated along the plane of the whiskers (parallel to the hot-pressing axis) average $K_{Ic}$ value was 5.5 MPa.$m^{\frac{1}{2}}$ for the 20 vol. % SiC whisker $Al_2O_3$ composites versus approximately 4.5 MPa.$m^{\frac{1}{2}}$ for pure $Al_2O_3$. Observation of fracture surfaces indicated significant whisker pull-out in the two types of composites listed in Table 2.

It will be seen that the present invention provides for the fabrication of highly dense SiC whisker-ceramic composites which provide a significant increase in fracture toughness over the monolithic ceramic material. It is expected that these composites will be of a significant value in the form of production components which are subjected to high temperatures and pressures. Also, the fracture toughening process (whisker pull-out) in the composites is activated during slow crack growth (fatigue) and substantially increase the resistance to slow crack growth in the composite. Furthermore, the increased slow crack growth resistance associated with the increased fracture toughness would substantially increase the lifetime of these ceramics when they are subjected to various conditions under applied stress such as in heat engines and the like. The resulting increase in the fracture toughness ($K_{Ic}$) provided in the composites of the present invention allows for high-fracture strength components to be fabricated which have larger flaw or defect sizes than allowable in conventional ceramic composites. This flow size allowance results from a dependence of flaw size (c) for a given desired fracture strength ($K_{Ic}$) which is provided by the formula $\sigma_{Ic} Y K_{Ic} c^{-\frac{1}{2}}$ where (Y) is a geometry factor. Thus, for fracture strengths of 700 MPa the allowable flaw size can be increased by a factor of 5, i.e., from about 50 micrometers to 250 micrometers by increasing the fracture toughness from 4 MPa.$m^{\frac{1}{2}}$ to about 9 MPa.$m^{\frac{1}{2}}$.

I claim:

1. A ceramic composite characterized by increased toughness and resistance to fracture, comprising a composite defined by a matrix of ceramic material, *wherein said matrix is selected from the group consisting of $A_2O_3$, mullite and $B_4C$* having homogeneously dispersed therein about 5 to 60 vol. % of silicon carbide whiskers, with said silicon carbide whiskers having a microcrystalline structure and [in] a size range of about 0.6 μm in diameter and a length of 10 to 80 μm *and which are characterized by crack bridging pull-out from said matrix when said matrix is subjected to crack-forming stresses,* said composite being of a density greater than about 99% of the theoretical density.

2. The ceramic composite claimed in claim 1, wherein the silicon carbide whiskers are [essentially unidirectionally oriented] *preferentially aligned and randomly distributed in planes* in the matrix.

3. The ceramic composite claimed in claim 2, wherein the matrix is $Al_2O_3$, the concentration of silicon carbide whiskers in the matrix is about 20 vol. %, wherein fracture toughness of the composite is in the range of about 8 to 9 MPa.$m^{\frac{1}{2}}$ at room temperature, and wherein fracture strength of the composite is in the range of about 590 to 899 MPa at room temperature.

4. The ceramic composite claimed in claim 2 wherein the matrix is $3Al_2O_3.2SiO_2$, the concentration of silicon carbide whiskers in the composite is about 20 vol. % wherein fracture toughness of the composition is 4.6 MPa.$m^{\frac{1}{2}}$ at room temperature, and wherein fracture strength of the composite is about 438 MPa at room temperature.

5. The ceramic composite claimed in claim 1, wherein the silicon carbide whiskers are essentially omnidirectionally oriented in the matrix.

[6. The ceramic composite claimed in claim 1, wherein the ceramic matrix material is selected from the group consisting of $Al_2O_3$, $3Al_2O_3.2SiO_2$, $B_4C$.]

7. A method for preparing a ceramic composite having increased toughness and resistance to fracture, comprising the steps of forming a homogeneous mixture of [particulate ceramic material with] about 5 to 60 vol. % of silicon carbide whiskers having a monocrystalline structure and [in] a size range of about 0.6 μm in diameter and a length of 10 to 80 μm *with particulate matrix wherein said matrix is selected from the group consisting of $Al_2O_3$, mullite and $B_4C$,* and hot pressing the mixture at a pressure in the range of about 28 to 70 MPa and temperature in the range of about 1600° to 1900° C. for a duration of 0.75 to 2.5 hours to provide a composite with a density greater than about 99% of the theoretical density of the ceramic material *and in which composite the silicon carbide whiskers are characterized by crack bridging pull-out from the ceramic material when said composite is subjected to crack-forming stresses.*

8. A method for preparing a ceramic composite as claimed in claim 7, wherein the ceramic material is of a particle size less than about 44 m.

[9. A method for preparing a cermamic composite as claimed in claim 8, wherein the ceramic material is selected from the group consisting of $Al_2O_3$, $3Al_2O_3.2SiO_2$, and $B_4C$.]

10. A method for preparing a ceramic composite as claimed in claim [9] 7, wherein the silicon carbide whiskers are preferentially aligned along an axis of the composite by unidirectionally hot pressing the mixture along an axis peripendicular to the first-mentioned axis.

11. The method for preparing a ceramic composite as claimed in claim [9] 7, wherein the silicon carbide whiskers are omnidirectionally aligned with the composite by isostatically hot pressing the mixture.

* * * * *